United States Patent

[11] 3,587,973

| [72] | Inventors | Jeremiah P. Wolf<br>Cincinnati;<br>William V. Sutherland, Milford; Donald J.<br>Dusa, Cincinnati, Ohio |
|---|---|---|
| [21] | Appl. No. | 873,217 |
| [22] | Filed | Nov. 3, 1969 |
| [45] | Patented | June 28, 1971 |
| [73] | Assignee | General Electric Company |

[54] PROPULSION NOZZLES WITH IMPROVED SOUND SUPPRESSION
18 Claims, 15 Drawing Figs.

[52] U.S. Cl. .................................................. 239/265.13,
239/265.19, 181/51
[51] Int. Cl. ....................................................... B64d 33/04,
B63n 11/10
[50] Field of Search .......................................... 239/265.13,
265.17, 265.19, 265.29, 265.31, 265.37, 265.39,
265.41; 181/33.22, 33, 43, 51; 60/228, 230

[56] References Cited
UNITED STATES PATENTS

| 3,344,882 | 10/1967 | Jean-Claude Bellion et al. | 181/33.221 |
| 3,454,227 | 7/1969 | Motycka | 239/265.39 |
| 3,511,441 | 5/1970 | Tumicki | 239/265.29 |
| 3,527,409 | 9/1970 | Tumicki | 239/265.39 |

FOREIGN PATENTS

| 1,173,367 | 2/1959 | France | 239/265.13 |
| 818,201 | 8/1959 | Great Britain | 239/265.13 |
| 859,994 | 1/1961 | Great Britain | 239/265.13 |

Primary Examiner—M. Henson Wood, Jr.
Assistant Examiner—Edwin D. Grant
Attorneys—Derek P. Lawrence, E. S. Lee, III, Lee H. Sachs, Frank L. Neuhauser, Oscar B. Waddell and Joseph B. Forman ABSTRACT: Two forms of sound suppressor for convergent, divergent propulsion nozzles are shown. In both, the flaps of the convergent, primary nozzle are swung to a divergent position in sealing engagement with an end wall having a plurality of tubes through which the hot gas stream is discharged to minimize noise generation. Also in both forms, the suppressor end wall is formed, at least in part, by sectors which are swung to stowed positions in which they form a part of the divergent expansion surface of the nozzle. In one form, the sectors are pivoted from the nozzle structure to form the entire end wall and the flaps forming the remainder of the divergent nozzle are opened outwardly to increase flow of secondary and tertiary air to the rear surface of the end wall. In the other form, the sectors are mounted on a ring which also forms a part of the end wall and the ring is translatable so that it and the sectors can block the hot gas stream and discharge it through blow-in doors to provide reverse thrust. Butterfly valves in the tubes are closed to provide sufficient blockage for reverse thrust.

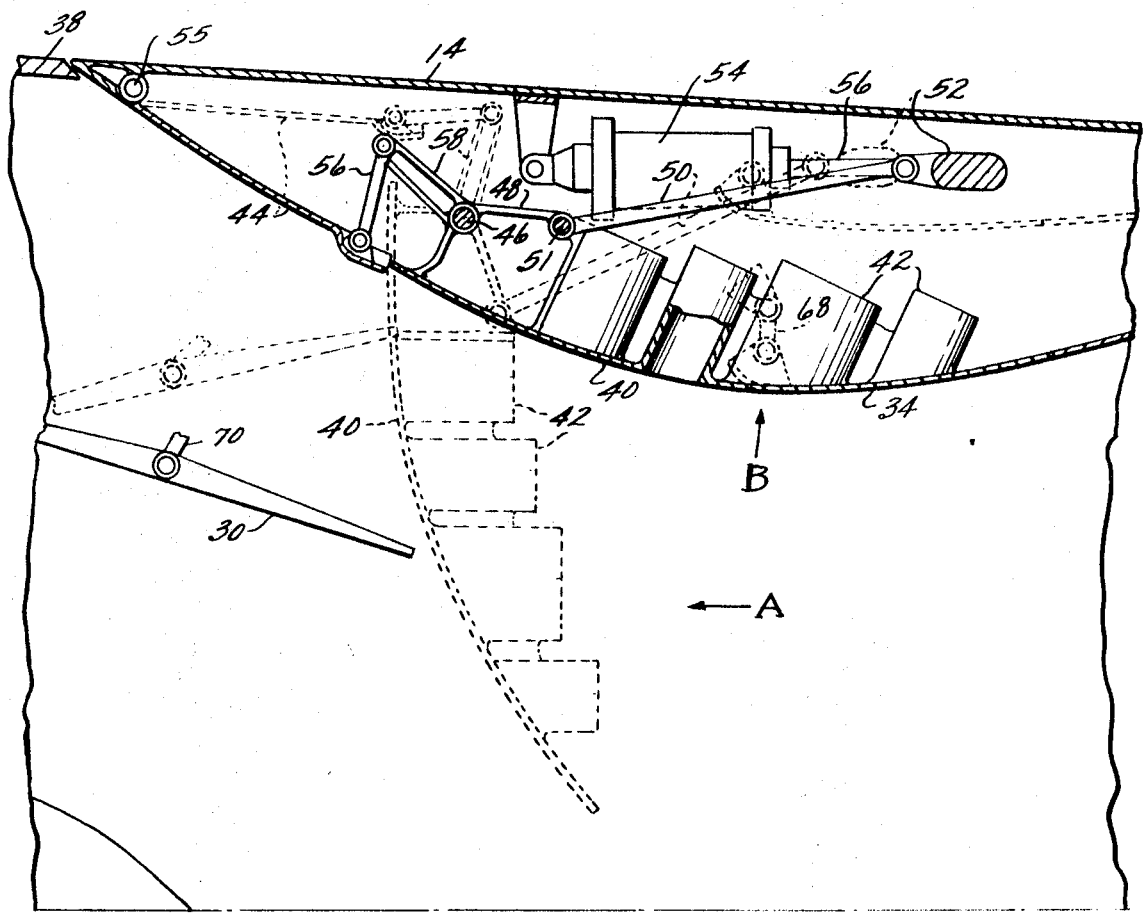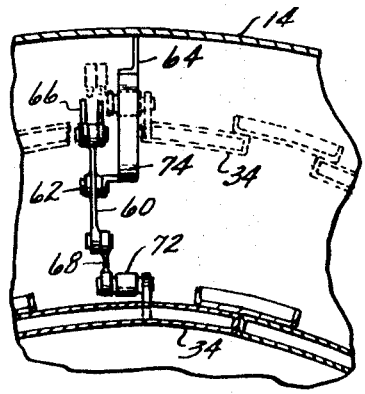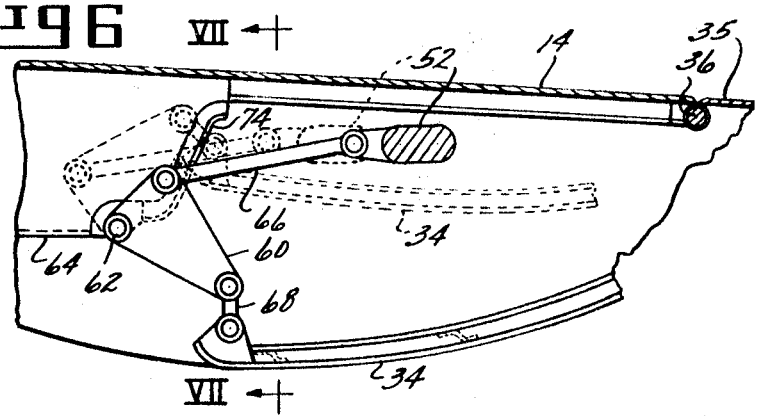

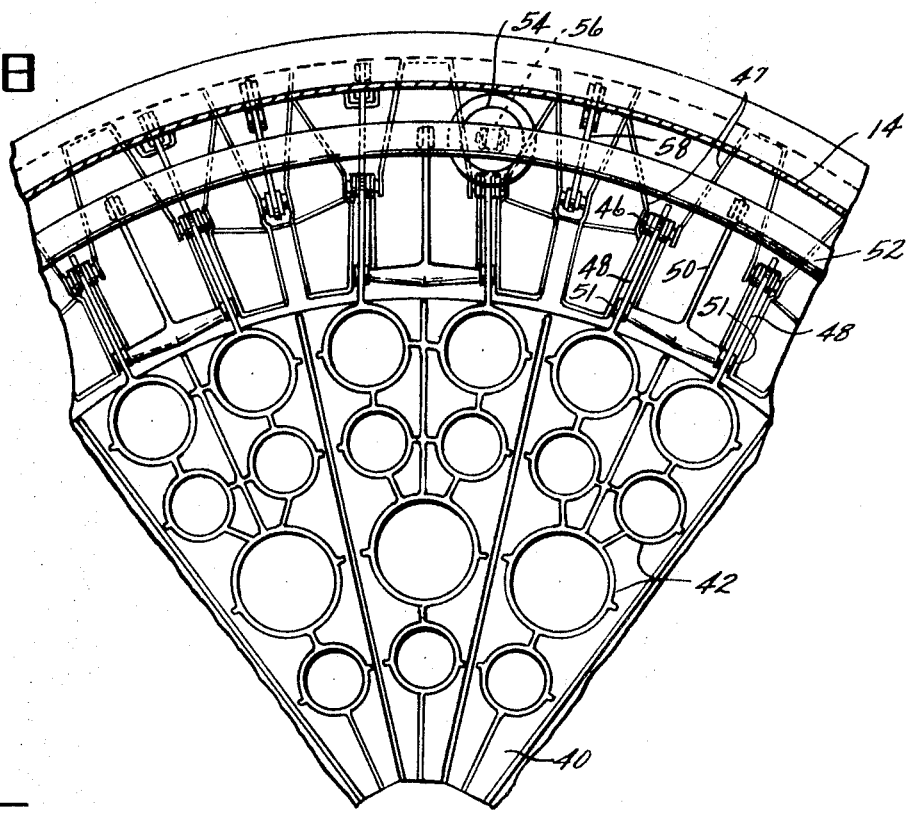
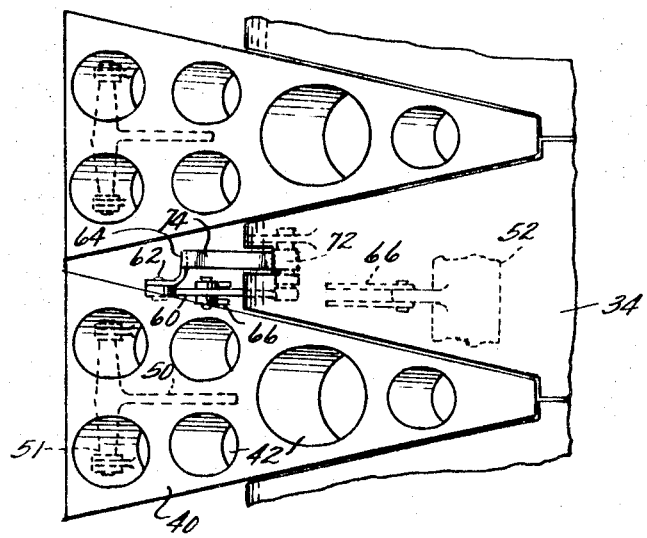

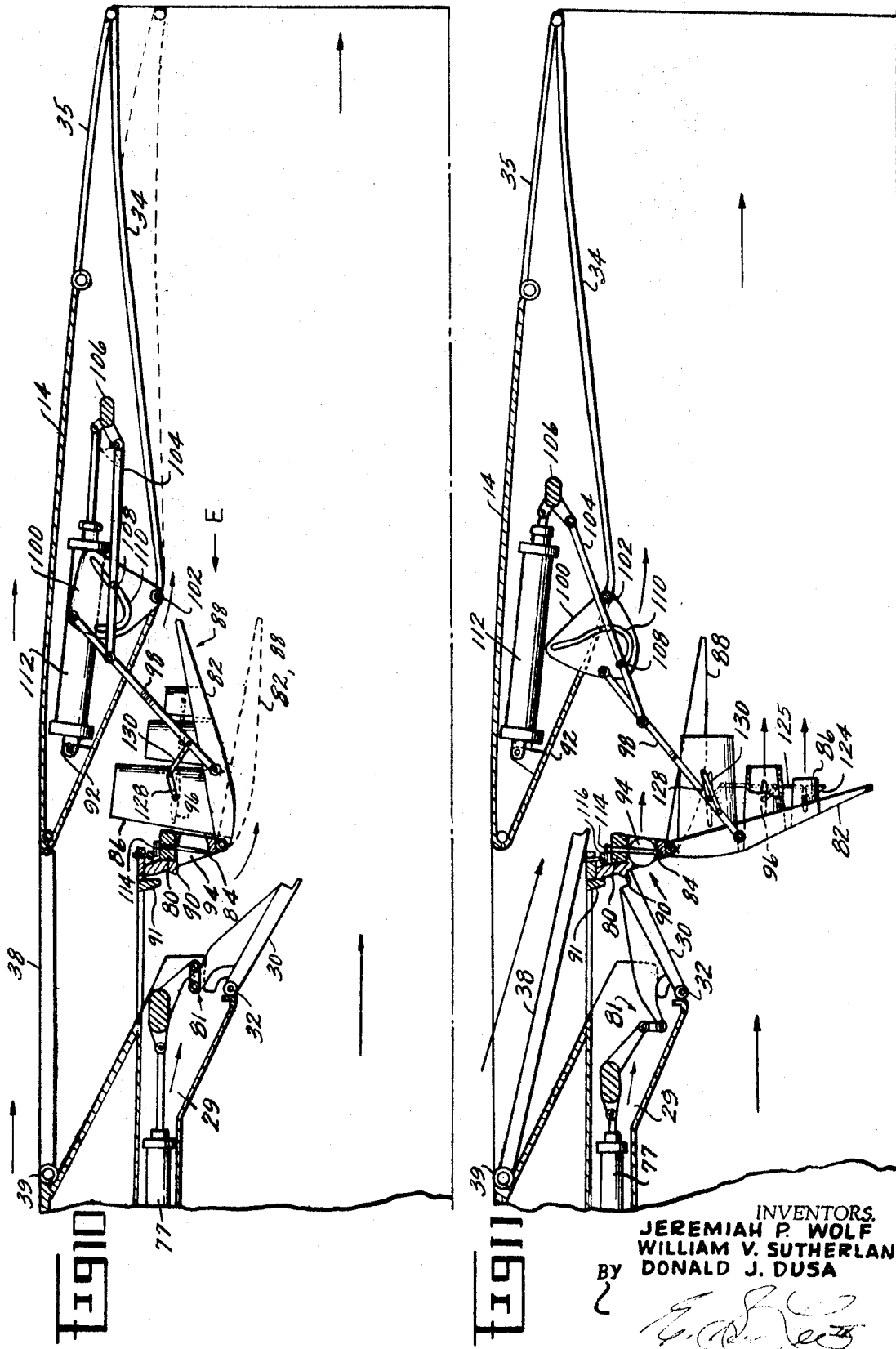

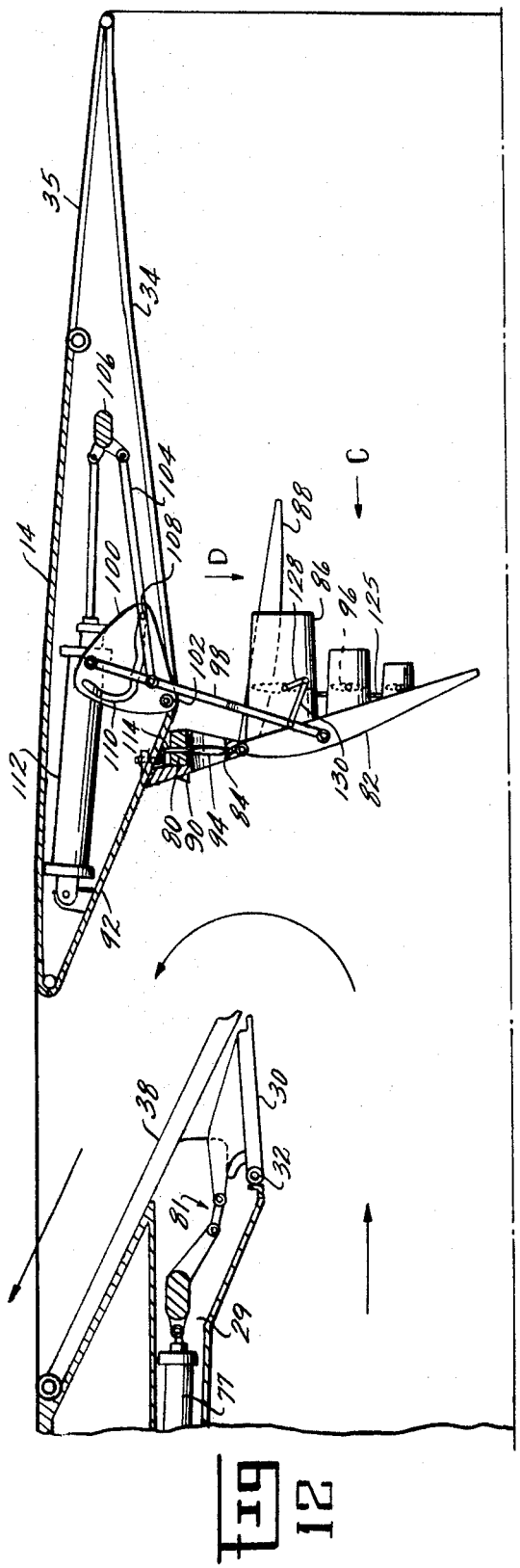

PROPULSION NOZZLES WITH IMPROVED SOUND SUPPRESSION

The invention described and claimed in the U.S. Pat. application herein resulted from work done under U.S. Government contract FA-SS-67-7. The U.S. Government has an irrevocable, nonexclusive license under said application to practice and have practiced the invention claimed herein, including the unlimited right to sublicense others to practice and have practiced the claimed invention for any purpose whatsoever.

The present invention relates to improvements in propulsion nozzles as are employed in combination with gas turbine engines and particularly to the reduction of sound generated by such nozzles, more commonly referenced as sound suppression.

Sound generated by discharge of a hot gas stream from a propulsion nozzle has long been recognized as being objectionable in low level operation of aircraft over populated areas. The problem is most accentuated during landing and takeoff of aircraft. Many proposals have been made, and some put into use, to reduce such sound or noise to more acceptable levels.

It is usual to reference devices for this purpose as suppressors or sound suppression devices. Basically, most such devices alter the usual circular cross section of the propulsive jet to increase mixing with ambient air and/or increase the cross-sectional periphery of the hot gas stream which shears with the ambient air. It is desirable that such devices be retractable and stowable when sound suppression is not required. With this capability, the nozzle can be restored to its basic configuration for efficient propulsion throughout the major portion of the aircraft's flight at high altitudes where noise is attenuated before reaching ground level.

Much work has been done in evaluating sound suppression techniques. From this evaluation the so-called multitube suppressor has been identified as one of the most effective in providing substantial reductions of noise levels with a minimum thrust decrement. This technique involves discharging the hot gas stream from a plurality of tubes or individual nozzles as opposed to the single nozzle discharge of a conventional nozzle.

One object of the present invention is to provide improved means for deploying and stowing multitube suppressors used with propulsion nozzles.

The requirements discussed above are further complicated when attempting to provide suppression for nozzles having supersonic capabilities. Subsonic propulsion nozzles are of the simple convergent type. Supersonic nozzles are of the convergent-divergent type and are further complicated by a requirement for the capability to vary the convergent throat area, as well as the nozzle discharge area, to obtain efficient propulsion at the various engine cycle conditions required for propulsion of the aircraft at both subsonic and supersonic velocities.

Not only are the problems of stowing a suppressor more difficult in such a nozzle but, further, the suppressor, when stowed, must present little or no obstruction to the supersonic gas streams present both within and without the nozzle.

Accordingly, another object of the invention is to provide an improved sound suppression device for a propulsion nozzle having supersonic capabilities with provision for stowing the suppressor so that it causes minimum aerodynamic losses.

A further object is to attain the above ends, utilizing a multitube suppressor technique for maximum suppression effectiveness.

Another object of the invention is to attain the above ends with a minimum decrement to the overall engine system performance capabilities, including, among other things, minimum added weight and simplicity of actuation systems to provide suppression of noise.

Another object of the invention is to provide such an improved suppressor and, additionally, means for utilizing it to block the hot gas stream so that the hot gas stream may be diverted laterally and forwardly to provide reverse thrust required for decelerating an aircraft.

In its broader aspects, the invention comprises a plurality of primary nozzle-forming flaps which are displaceable to a divergent position, engageable with the end wall of a suppressor mechanism. The end wall has a plurality of tubes from which the hot gas propulsive stream is discharged to reduce the noise generated by the nozzle. The suppressor mechanism is stowed outside the hot gas stream flow path when the primary flaps are in a convergent, propulsion position. Preferably the end wall of the suppressor mechanism is formed, at least in part, by a plurality of sectors which are pivoted outwardly to stowed positions. In a convergent, divergent nozzle for supersonic propulsion, the sectors form a part of the divergent, secondary nozzle.

In a more specific aspect the sectors collectively form the entire end wall of the suppressor means and are pivotally mounted on a pod. Additionally, the sectors may be curved to the curvature of the entrance throat portion of the secondary or divergent nozzle. In the deployed position, this curvature facilitates flow of relatively high pressure air to the bases of the tubes. Further, the secondary nozzle may comprise flaps which are pivotally connected to boattail flaps which, in turn, are mounted on the pod. When the suppressor means are deployed, these flaps are swung outwardly to increase the flow of secondary and tertiary air, the latter being derived from blow-in doors. Ramp means adjacent the blow-in doors are also displaced outwardly to increase tertiary air flow. Preferably a linkage system comprising a single actuation ring is employed to control these movements.

Alternately the suppressor means may comprise an outer annular ring on which the sectors are mounted. Triangular flaps may be mounted between the sectors to form an annular expansion surface when the sectors are in a stowed position and form a portion of the secondary nozzle.

The suppressor means may be also employed to supply reverse thrust by translating it downstream with the sectors in a wall-forming position and by further closing valves to provide a blockage for the hot gas stream. The hot gas stream is then discharged through blow-in doors to provide reverse thrust. Preferably a linkage system employing a single actuation ring controls movement of the suppressor means.

The above and other related objects and features of the invention will be apparent from a reading of the following description of the disclosure found in the accompanying drawings and the novelty thereof pointed out in the appended claims.

In the drawings:

FIG. 5 is a further enlarged section illustrating, in greater detail, the sound suppression mechanism of the invention;

FIG. 6 is a sectional angularly offset from the section of FIG. 5 and showing the flap control mechanism employed with the sound suppression mechanism;

FIG. 7 is a section taken on line VII–VII in FIG. 6;

FIG. 8 is a partial end view of the nozzle, looking in the direction of arrow A in FIG. 5 and showing the suppressor mechanism in its deployed position;

FIG. 9 is a partial view, looking in the direction of arrow B in FIG. 5, of the suppressor mechanism in its stowed position;

FIG. 10 is a longitudinal section through a second propulsion nozzle, embodying an alternate form of the invention, illustrating its supersonic flight position;

FIG. 11 illustrates the second nozzle in its sound suppression mode of operation;

FIG. 12 illustrates the second nozzle in its reverse thrust mode of operation;

Figure 1:
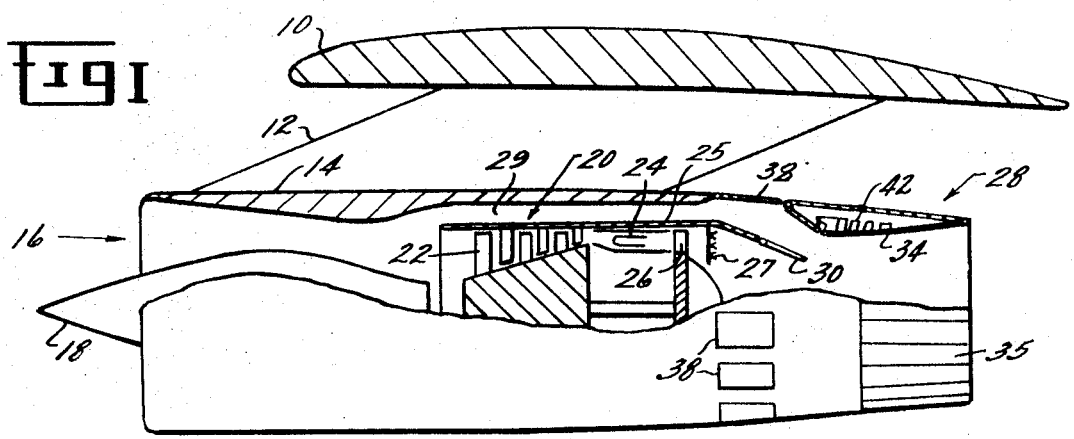
FIG. 1 is a simplified illustration of a gas turbine engine mounted on the wing of an aircraft.

FIG. 1 illustrates the installation of a pod-mounted gas turbine engine employing a propulsion nozzle and sound suppression mechanism embodying the present invention. An aircraft wing 10 is shown, in section, with a pylon 12 providing the structural connection to a generally cylindrical pod 14. A typical supersonic inlet 16 is formed at the forward end of the pod by an inlet spike 18. Air flows from the inlet 16 to a gas turbine engine 20, which is illustrated as conventionally comprising a compressor 22 for pressurizing air, a combustor 24 wherein the pressurized air supports combustion of fuel to generate a hot gas stream and a turbine 26 which is driven by the hot gas stream to power the compressor. The hot gas stream is augmented by combustion of fuel in an afterburner 27 and then converted to a propulsive thrust by a nozzle 28 which will be described in greater detail to give an understanding of the present invention.

Before leaving FIG. 1, it will be noted that the outer casing 25 of engine 20 is spaced from the inner surface of the pod 14 to provide a flow path 29 for what is herein referenced as "secondary" air. Thus, a small portion of the air entering the inlet 16 bypasses the engine and enters the propulsion nozzle 28 as secondary air in a manner and for purposes later described.

Figure 2:
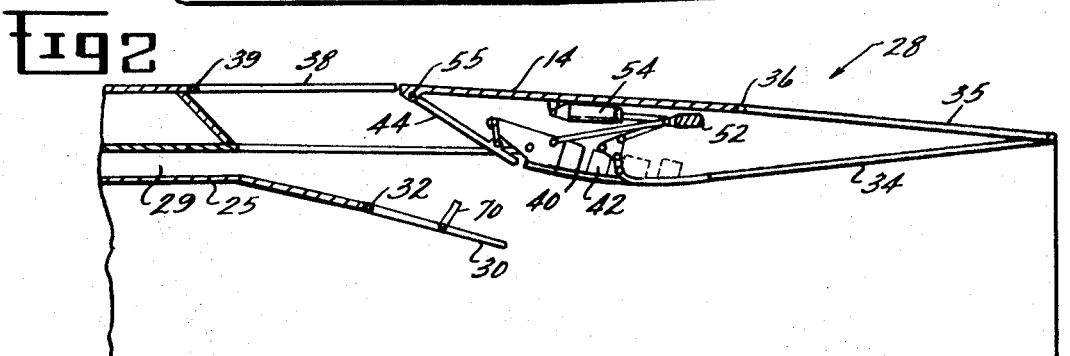
FIG. 2 is a longitudinal section, on an enlarged scale, through the propulsion nozzle of this engine, illustrating its supersonic flight position.

The nozzle 28, in supersonic flight, assumes a convergent, divergent configuration better illustrated in FIG. 2. The convergent portion of the nozzle, commonly referenced as the primary nozzle, comprises a plurality of flaps 30 which are pivotally mounted at 32 to the outer casing of the gas turbine engine. After the hot gas stream is accelerated through the primary portion, it is expanded against the divergent nozzle portion, commonly referenced as the secondary nozzle. The secondary nozzle comprises a plurality of flaps 34. Boattail flaps 35 are pivotally mounted at 36 on the pod 14 so that their outer surfaces form continuations of the aerodynamic surface of the pod. The flaps 34, 35 are pivotally connected at or adjacent their downstream ends. The upstream ends of the flaps 34 are connected to the pod structure by a linkage later described. Secondary air flow aerodynamically forms the expansion surface of the nozzle from the downstream ends of the flaps 30 to inner divergent surfaces of the flaps 34. The secondary air also cools the inner surfaces of the flaps 34.

Figure 3:
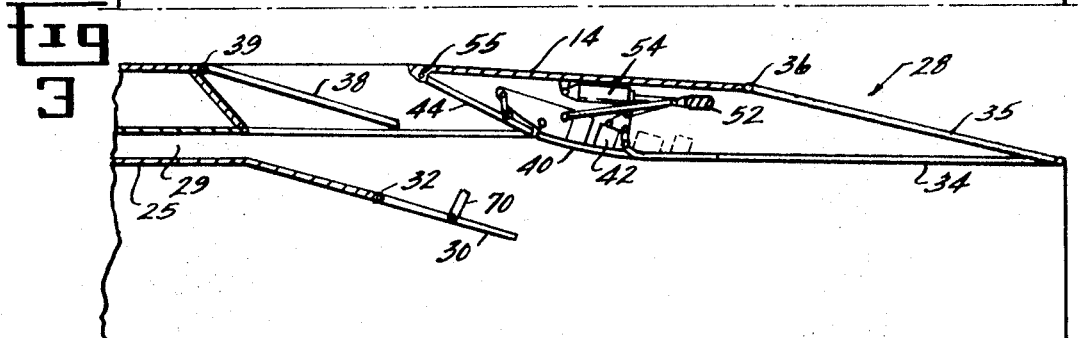
FIG. 3 illustrates the subsonic flight position of this nozzle.

In subsonic cruise operation, FIG. 3, the afterburner is shut down and normally the flaps 30 are pivoted inwardly to reduce the discharge area of the convergent nozzle portion. The flaps 34, 35 also pivot inwardly due to the pressure differential thereon to define an essentially cylindrical flow path surrounding the hot gas stream discharge from the convergent nozzle portion. Additionally, secondary and tertiary air aerodynamically assists in defining the hot gas stream flow path along the flaps 34. The tertiary air is derived through blow-in doors 38 which are closed during supersonic flight. The blow-in doors are pivoted at 39 on the pod 14 and are angularly spaced around its circumference (see FIG. 1) upstream of the flaps 34.

The preceding outline of the supersonic and subsonic modes of operation of the nozzle, to the extent described, delineates known concepts with which the present sound suppression mechanism is uniquely compatible.

Figure 4:
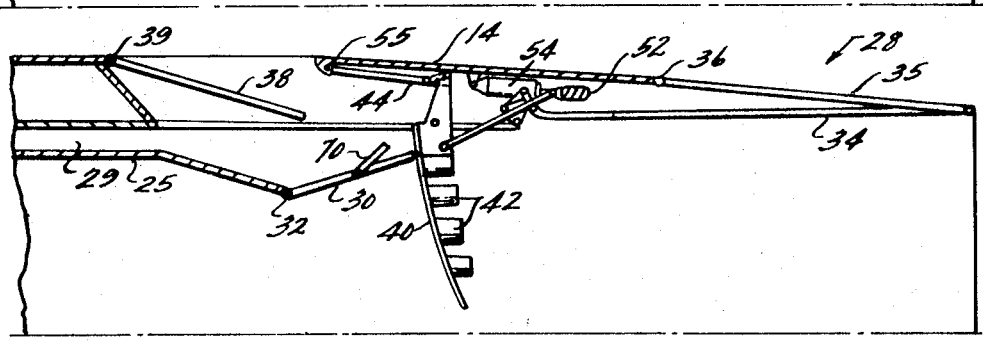
FIG. 4 illustrates the nozzle in its sound suppression mode of operation.
Figure 13:
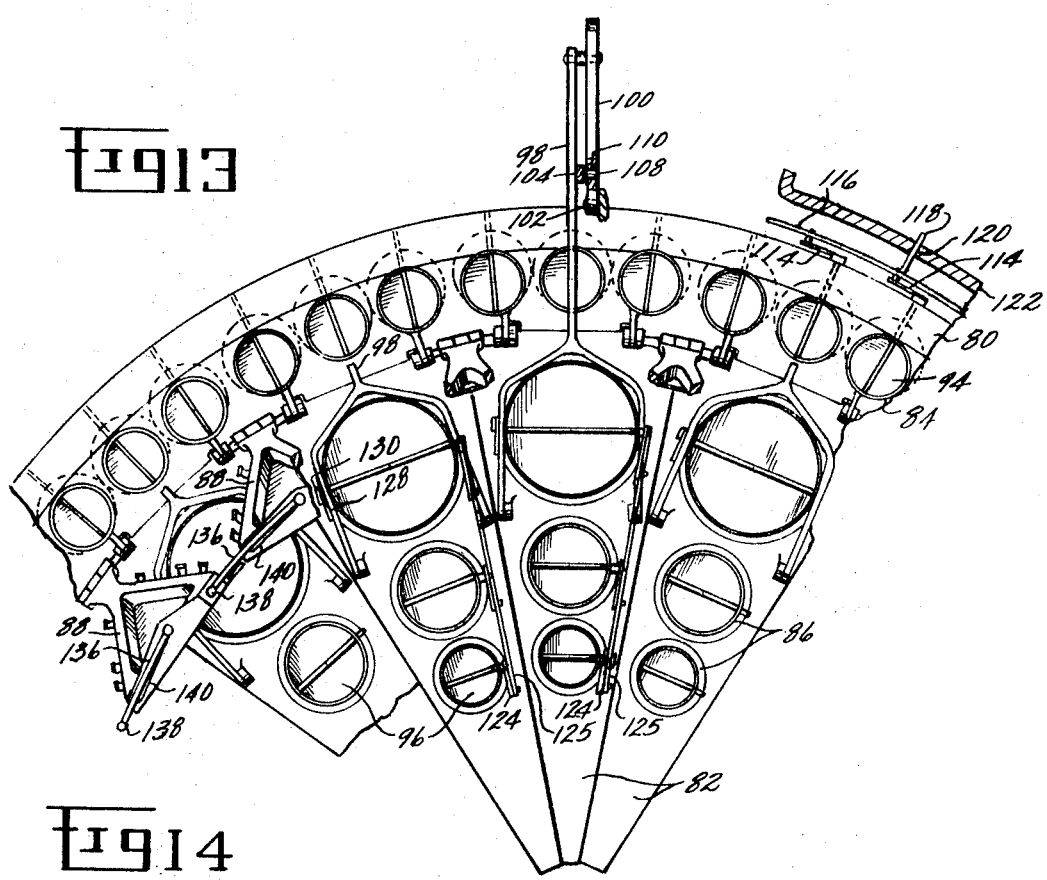
FIG. 13 is a partial end view of the nozzle looking in the direction of arrow C in FIG. 12, of the sound suppressor mechanism in its deployed position for thrust reverse operation.

FIG. 4 shows the sound suppression mechanism in its deployed position. The mechanism comprises a plurality of sectors 40 (see also FIG. 5) having tubes 42 projecting from their rear surfaces. The primary flaps 30 are pivoted to a divergent configuration and sealingly engage the sectors 40 outwardly of the tubes 42. The flow path of the hot gas stream is thus increased as it approaches the blockage of the sectors 40 and then is accelerated through the tubes 42 to provide a plurality of propulsive jets. The increased flow area of the divergent nozzle flaps 30 enables the tubes 42 to be adequately spaced and have a combined effective area approximating the desired discharge area of the convergent nozzle section for a given pressure and temperature of the hot gas stream.

One important consideration in multitube suppressors is to maintain a high flow rate of ambient air around each tube and the high energy gas streams discharged therefrom. This is important not only from a sound suppression standpoint, but also from an aerodynamic performance standpoint. In connection with the latter factor, starving of air from the rear surface of the segments 40 results in a negative pressure being created which decreases the net thrust capability of the overall nozzle system.

In the present nozzle it is primarily tertiary air which provides the necessary functions referenced above. To facilitate free flow of tertiary air to the multitube discharge, the flaps 34 and 35 are pivoted outwardly. Additionally, ramps 44, at the downstream ends of the blow-in doors, are pivoted outwardly. The ramps 44 normally guide tertiary air to upstream ends of the flaps 34. These features, in combination with the outwardly curved rear surfaces of the deployed segments, provide a large flow of ambient air to the rear of the deployed suppressor, thereby enhancing noise suppression and minimizing thrust losses normally inherent in suppression devices.

Further noise suppression is provided by the shrouding effect of the secondary nozzle flaps 34. This effect is increased by the fact that the shrouding length is several times the diameter of the individual jets discharged from the tubes 42.

Further and more detailed features of the invention will be apparent by reference to FIGS. 5—8 for a description of the mounting of and actuation means for the sectors 40, as well as the actuation means for the flaps 34, 35 and ramps 44.

In the supersonic and subsonic positions of the nozzle (FIGS. 2 and 3) the sectors 40 are stowed and form, in part, the upstream portions of the secondary nozzle, as can be better seen from FIG. 5. The sectors 40 are correspondingly curved to the throat curvature of the secondary nozzle to facilitate flow of secondary and tertiary air thereto. It is this curvature which was referenced above as facilitating the flow of air to the bases of the tubes when the sectors are deployed. It will also be apparent from FIGS. 5 and 9 that the sectors, when stowed, are nested with the upstream ends of the secondary flaps 34.

Each sector 40 is pivoted on pins 46 which pass through brackets 48 on the segment 40. The pins 46 are mounted on sheet metal brackets 47 (FIG. 8) in fixed relation on the pod 14. A T-shaped link 50 spans the pair of brackets on each sector and is pivotally connected thereto by pins 51. The other end of each link 50 is pivotally connected to an actuation ring 52 which is appropriately guided for longitudinal, axial movement relative to the pod 14. A plurality of actuators 54 (one is shown) are mounted on the pod 14 with their rods 56 connected to the actuation ring 52.

The ramps 44, which are pivotally connected to the pod structure at 55, are connected by links 56 to arms 58 formed integrally with the sector brackets 48.

The linkages for deploying the secondary flaps 34 and boattail flaps 35 are also connected to the actuation ring 52, as shall be seen by reference to FIGS. 6 and 9. A lever plate 60 is pivotally mounted at 62 on a bracket 64, the latter being a part of the structure of the pod 14. The lever plate 60 is connected by a link 66 to the actuation ring 52. The upstream end of the respective secondary flap 34 is pivotally connected to the lever plate 60 by a link 68.

This arrangement comprises the linkage earlier referenced which enables the flaps 34 and 35 to automatically swing between the supersonic position and the subsonic position of FIGS. 2 and 3 in response to pressure differentials thereacross. During these modes of operation, the actuation ring 52 is fixed and, therefore, the upstream end of the flap 34 is free to swing on link 68 about its relatively fixed pivot point on the lever plate 60.

The described linkage system enables a single actuation ring to be used for the deployment of the sound suppression sectors 40, as well as the desired positioning of the ramps 44, secondary flaps 34, and boattail flaps 35. The solid line showing of FIGS. 5 and 6 illustrates the actuation ring 52 position for supersonic or subsonic flight. When the sound suppression mode is to be put in operation, the actuators 54 displace the ring 52 to its broken line position in sequence with displacement of the convergent flaps 30 to their divergent condition, also indicated by broken lines in FIG. 5. The actuator means for the primary flaps 30 may be of a known configuration including links 70 connected to these flaps.

In any event, the flaps 30 are swung to their divergent positions as the actuation ring is displaced to its broken line position.

Displacement of the actuation ring 52 pivots the sectors 40 to their deployed positions. Further, the connection through arm 58 and link 56 pivots the ramps 34 outwardly. Additionally, the lever plates 60 (FIG. 6) are pivoted in a counterclockwise direction, swinging the inner ends of the flaps 44 outwardly until a cam roll 72 engages a camming surface 74 on the bracket 64. Continued rotation of the lever plate 60 displaces the upstream ends of the flaps 34 further outwardly and at the same time causes the downstream ends of both the flaps 34 and 35 to pivot outwardly about the pivotal connection 36 of the flaps 35.

After the sectors 40 have been so deployed, the convergent flaps are brought into sealing engagement therewith outwardly of the outer row of tubes 42. The gas stream is thus discharged from the tubes 42 in the manner previously described to provide sound suppression with a minimum of thrust loss. The inner ends of the sectors define a central opening from which a portion of the gas stream is also discharged.

As has already been mentioned, the curvature of the sectors 40 facilitates flow of secondary and tertiary air to the downstream surface of the suppressor end wall which these sectors compositely form. Further, the outward displacement of the ramps 44 and flaps 34, 35 increases tertiary and secondary air flow through the nozzle. All of these features contribute to a maximum pressure on the downstream surface of the suppressor end wall and thus minimize any thrust penalty incident to the use of a suppressor. Further, the increased or maximized secondary and tertiary air flows contribute to sound suppression by increasing the amount of cool air that is mixed with the hot gas stream. This suppression effect is enhanced by the shrouding action of the flaps 34, 35 around the mixing zone.

Referencing now FIGS. 10—15, another embodiment of the invention will now be described. Insofar as engine components and the strictly aerodynamic components of this nozzle are concerned, they may be essentially the same as in the previously described embodiment and are identified by like reference characters. Thus, the hot gas stream is, in normal flight (FIG. 10), discharged from a primary nozzle comprising flaps 30 which are pivotally mounted at 32. In supersonic flight (the full line position of FIG. 10), the hot gas stream is expanded through the divergent, secondary nozzle comprising the flaps 34. These secondary flaps are pivotally mounted, at their upstream ends, by a linkage, not shown, for limited movement, and, at their downstream ends, they are pivotally connected to the boattail flaps 35. The last named flaps, again, are pivotally mounted on the pod to form an aerodynamically positioned secondary nozzle. Likewise, the same blow-in doors 38 are provided in the pod 14 to direct tertiary air into the nozzle when desired. One difference to be noted is that the primary flaps 30 are positioned by actuators 77 mounted in the secondary air passage 29 and connected to the flaps 30 by links 81.

The suppressor means comprises an annular ring 80 having sectors 82 pivotally mounted around its inner periphery. The ring 80 has a circumferential row of tubes 84 therethrough, while each sector 82 has tubes 86 projecting therefrom. Triangular flaps 88 are also pivotally mounted on the ring 80, alternating with the sectors 82.

In supersonic operation (FIG. 10) the sectors 82 and flaps 88 form the upstream portion of the divergent secondary nozzle. Thus the hot gas stream, after being discharged from the primary nozzle, is expanded against the sectors 82 and flaps 88 (see also FIG. 15) and then against the flaps 34. Again, secondary air aerodynamically forms the expansion surfaces at the discontuities between the flaps 30 and the sectors 82 and flaps 88, as well as between the latter and the flaps 34.

The normal subsonic position of the sectors 82 and flaps 88 and 34 is indicated by broken lines in FIG. 10. FIG. 11 illustrates the suppression position of the nozzle. In this position the sectors have been swung inwardly to compositely form, in combination with the ring 80, an end wall. The primary flaps 30 have been swung outwardly into sealing engagement with a circumferential lip 90 formed on the ring 80. The hot gas stream is thus discharged as a plurality of jet streams through the tubes 84 and 86 and a central opening defined by the inner ends of the sectors 82. When the sectors 82 are deployed for sound suppression, the flaps 88 abut each other (FIGS. 11 and 14) so that they are essentially parallel to the jet streams and intermediate the tubes row 84 and the outer row of tubes 86.

This plurality of jets plus the mixing action with secondary as well as tertiary air (which enters the blow-in doors 38) provides substantial reduction in perceived noise levels with a minimum thrust decrement. Again, the combined effective areas of the tubes 84 and 86 equal the approximate discharge area of the primary nozzle for the pressure and temperature of the hot gas stream.

FIG. 12 illustrates the deployment of the sound suppressor means during reverse thrust operation. The ring 80 and sectors 82 are translated to a position downstream of the blow-in doors 38. The sectors 82 are deployed to their wall-forming position. The ring 80 engages the fixed ramp 91 which leads from the blow-in doors 38 to the secondary flaps 34. Butterfly valves 94, 96, in the tubes 84 and 86 respectively, are closed to provide substantially complete blockage to the hot gas stream. The hot gas stream is thus deflected laterally and forwardly to provide reverse thrust.

Deployment and stowing of the described suppressor means is controlled by a linkage system now to be described. A forked link 98 (FIGS. 10 and 13) is pivotally connected to each sector 82. Each link 98 is pivotally mounted, at its outer end, on a respective lever plate 100. Each lever plate is pivotally mounted by respective pins 102 on the structure of the pod 14. Control links 104 are pivotally connected to the links 98 intermediate their ends. The control links 104 are pivotally connected, at their opposite ends, to a single actuation ring 106. Each control link also has a cam follower 108 which rides in a cam slot 110 formed in the adjacent lever plate 100. A plurality of actuators 112 (one is shown) are mounted on the pod 14 with their piston rods connected to the actuation ring 106. The actuator forces are balanced to translate the actuation ring uniformly in an axial direction.

The described linkage system supports the sectors 82 and ring 80 on the nozzle structure. Axial translation of the ring 106 causes the sectors to pivot to the various positions described in connection with FIGS. 10—13. FIG. 11 illustrates the extreme upstream position of the actuation ring 106 wherein the sound suppressor sectors 82 are deployed. In this deployed position, the ring 80 engages an abutment 92 to obtain accurate location relative to the flaps 30. The described linkage (note cam 110) pivots the sectors 82 to the broken line, subsonic position of FIG. 10 with a relatively small longitudinal movement of the ring 80. The ring 80 moves only slightly further as the sectors 82 are swung to their full line, supersonic position of FIG. 10. This described linkage, and particularly the cam track 110, controls axial translation of the ring 80 and redeployment of the sectors 82 for thrust reversal upon translation of the actuation ring 106 to its extreme downstream position shown in FIG. 12.

The butterfly valves 94 each have a lever 114 connected thereto. These levers are pivotally connected to a unison ring 116 which has a plurality of outwardly projecting fingers 118.

The fingers 118 project into cam tracks 120 formed in longitudinal, structural portions 122 of the pod which are disposed, in an angular sense, intermediate the blow-in doors 38. The tracks 120 control the angular position of the unison ring 116 and are configured to rotate the unison ring and close the valves 94 as the tube ring is translated to its downstream, thrust reverse position.

The butterfly valves 96 each have a lever 124 secured thereto. The levers 124 are interconnected to a link 125. The outer butterfly valve of each sector also has a lever 128 secured thereto. The levers 128 are connected to the respective forked links 98 by links 130. The relative angular position between the forked links 98 and the sectors 82 thus controls the position of the butterfly valves 96 so that in the sound suppressed mode of operation, these valves are open and in the supersonic flight and reverse thrust modes of operation, these valves are closed.

Figure 14:
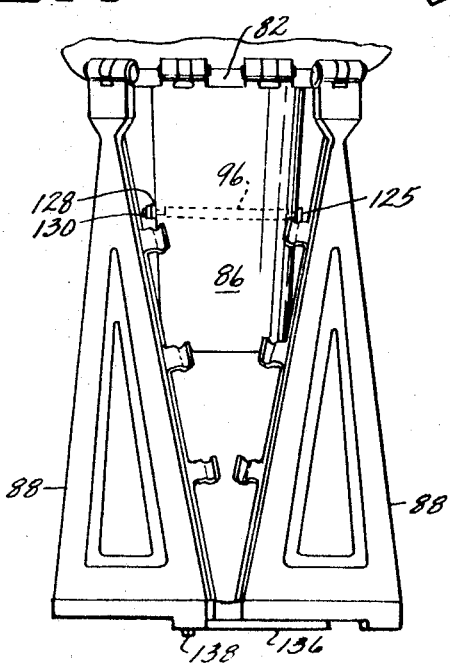
FIG. 14 is a fragmentary view, looking in the direction of arrow D in FIG. 12 and shows certain flaps.
Figure 15:
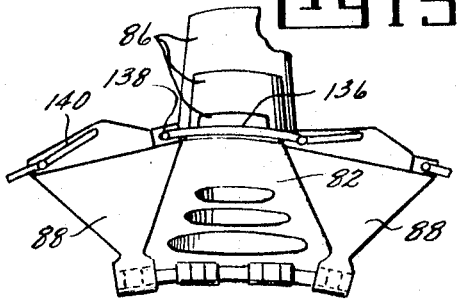
FIG. 15 is a fragmentary view, looking in the direction of arrow E in FIG. 10 and showing another position of these flaps.

Referencing FIGS. 14 and 15, it will be seen that the flaps 88 are compositely formed as lightweight sheet metal fabrications. They are interconnected by fixed arms 136 secured thereon with each arm having a lug 138 which rides in a slot 140 formed in the adjacent flap. In the divergent positions of the sectors 82, the flaps 88 float with the sectors (FIG. 15). When the sectors 82 are pivoted inwardly, inward movement of the flaps 88 is limited as they engage each other (FIG. 14).

The present description has omitted many details which are well known to those skilled in the art. For example, it is assumed that sealing means would be employed, where needed, between the several flaps which have been referenced. It is also assumed that a person skilled in the art would recognize that a star-type flap arrangement could be employed for the primary nozzle instead of the straight flaps which are shown.

Various other modifications and alternate embodiments will occur to those skilled in the art within the spirit and scope of the present inventive concepts.

Having thus described the invention, what is claimed as novel and desired to be secured by Letters Patent of the United States is:

We claim:
1. A propulsion nozzle comprising:
a casing defining the outer bounds of a hot gas flow path;
a plurality of flaps mounted on said casing and forming a casing outlet of variable area;
means for displacing said flaps from a convergent nozzle position to a divergent position of substantially increased area;
noise suppressor means including in its deployed position, an end wall having a plurality of tubes directed downstream, with said flaps, in their divergent position, sealingly engaging the end wall outwardly of said tubes whereby the hot gas stream is discharged from said tubes to reduce the noise generated by the nozzle; and
means for stowing the noise suppressor means outside the hot gas stream flow path when said flaps are in their convergent nozzle position.

2. A propulsion nozzle as in claim 1 wherein:
the end wall of the suppressor is formed, at least in part, by a plurality of sectors; and
the stowing means comprise means for pivoting the individual sectors outwardly to stowed positions.

3. A propulsion nozzle as in claim 2 which is adapted for supersonic propulsion and the referenced flaps form a primary nozzle when displaced to a convergent nozzle position and further including:
a divergent, secondary nozzle downstream of said primary nozzle; and
the stowing means swing said sectors to positions in which they form a part of said divergent, secondary nozzle.

4. A propulsion nozzle as in claim 3 further comprising:
a structural pod concentric of and spaced outwardly from said first casing, said pod providing, at least in part, the outer surface of the propulsion nozzle; and
further wherein:
said sectors collectively form substantially all of said end wall and are pivotally mounted on said pod.

5. A propulsion nozzle as in claim 4 wherein:
the suppressor tubes project from the downstream surfaces of the sectors in their deployed position and in their stowed position, the tubes are disposed in a space between the secondary nozzle and the pod, and the wall portions of the sectors are nested in and correspondingly curved with the curved entrance throat portion of the secondary nozzle; and
whereby in their deployed position, the sectors are curved in a downstream direction to facilitate the flow of relatively high pressure air to the bases of the tubes.

6. A propulsion nozzle as in claim 4 wherein:
the secondary nozzle comprises a plurality of flaps pivotally mounted at their downstream ends; and
means are provided for pivoting the upstream ends of the secondary flaps outwardly when the sound suppression means is in its deployed position.

7. A propulsion nozzle as in claim 6 wherein:
the stowing means and the secondary flap-pivoting means comprise a single actuation ring mounted between said pod and said secondary flaps and means for translating the ring axially to effect the stowing and pivoting functions.

8. A propulsion nozzle as in claim 6 further comprising:
a plurality of boattail flaps pivotally connected to said pod and to said secondary flaps at their downstream ends and forming a "free floating" nozzle wherein the flaps are positioned by the aerodynamic forces thereon; and
means for pivoting the boattail flaps outwardly, as well as the secondary flaps, when the suppressor means is in its deployed position, and in so doing, overcoming any aerodynamic positioning forces.

9. A propulsion nozzle as in claim 8 wherein:
the stowing means and the flap-pivoting means comprise a single actuation ring mounted between said pod and said secondary flaps, and means for translating the ring axially to effect the stowing and pivoting functions and including a linkage connection with the upstream end of each secondary flap to accommodate limited pivotal movement when the secondary and boattail flaps are aerodynamically positioned.

10. A propulsion nozzle as in claim 6 further comprising:
blow-in doors spaced around the circumference of said second casing approximately intermediate said first and second nozzles;
ramps for guiding air flow from said blow-in doors to the throat section of said secondary nozzle flaps; and
means for pivoting the downstream ends of said ramps outwardly when the suppressor means is in its deployed position.

11. A propulsion nozzle as in claim 10 wherein:
the suppressor tubes project from the downstream surfaces of the sectors in their deployed position and in their stowed position, the tubes are stowed between the secondary nozzle flaps and the pod, and the wall portions of the sectors are nested in and correspondingly curved with the curved entrance throat portion of the secondary nozzle whereby, in their deployed position, the sectors are curved in a downstream direction to facilitate the flow of relatively high pressure air, derived, at least in part, from the blow-in doors to the bases of the tubes; and
the stowing means, the flap-pivoting means and the ramp-pivoting means comprise a single actuation ring mounted between said pod and said secondary flaps and means for translating the ring axially to effect the stowing and pivoting functions and include a linkage connection with the upstream end of each secondary flap to accommodate limited pivotal movement when the secondary and boattail flaps are aerodynamically positioned.

12. A propulsion nozzle as in claim 2 wherein:
the suppressor means comprise;

an outer annular ring forming a portion of the wall and having tubes thereon; and a plurality of sectors forming the remainder of said wall and also having tubes thereon.

13. A propulsion nozzle as in claim 3 wherein:

the suppressor means comprise an outer ring forming a portion of the wall and having tubes thereon and a plurality of sectors pivotally mounted on the ring to form the remainder of said wall and also having tubes thereon; and further including triangular pieces mounted on said wall and forming in combination with the sectors, in their stowed position, the upstream portion of the secondary nozzle.

14. A propulsion nozzle as in claim 13 further comprising:

a structural pod concentric of and spaced outwardly from said first casing, said pod providing, at least in part, the outer surface of the propulsion nozzle;

said pod having blow-in doors for introduction of tertiary air into said nozzle; and means for displacing said ring and sectors downstream and pivoting the sectors to a wall-forming position and closing said tubes to block the hot gas stream and divert it through said blow-in doors to provide reverse thrust.

15. A propulsion nozzle as in claim 14 wherein:

the displacing and pivoting means comprise links connected to said sectors, flaps and rings and a single, axially displaceable actuation ring.

16. A propulsion nozzle as in claim 15 wherein:

the links include lever plates pivotal on said pod, said sector links being connected to said lever plates, control links connecting said sector links and said actuating ring, and a cam connection between said lever plates and said control links.

17. A propulsion nozzle as in claim 16 wherein, the tube-closing means comprise:

valve means, actuated by cam means cooperative with said pod, for closing the tubes in said rings and valve means, actuated by said linkage means, for closing the tubes in said sectors.

18. A propulsion nozzle as in claim 3 further comprising:

a structural pod concentric of and spaced outwardly from said first casing, said pod providing, at least in part, the outer surface of the propulsion nozzle, said pod further having openings through which the hot gas may be diverted to produce reverse thrust; and means for displacing sad suppressor means downstream in its deployed position and closing said tubes to block the hot gas stream and divert it through said pod openings.